F. H. FARMER.
INTERNAL DRIVE REAR AXLE.
APPLICATION FILED FEB. 23, 1918.
1,305,454.
Patented June 3, 1919.
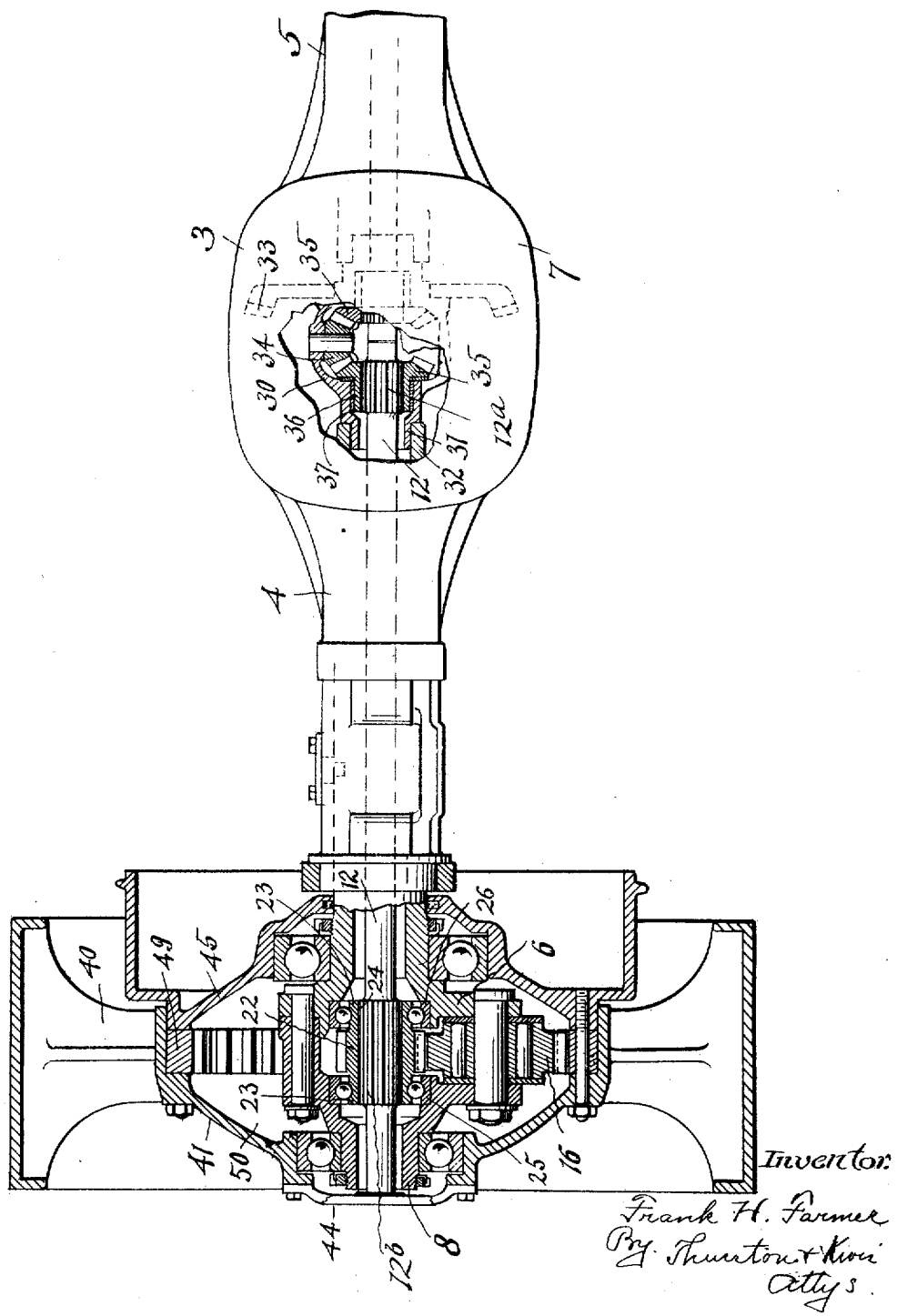
Inventor:
Frank H. Farmer
By Thurston & Known
Attys.

UNITED STATES PATENT OFFICE.

FRANK H. FARMER, OF CLEVELAND, OHIO, ASSIGNOR TO THE WHITE MOTOR COMPANY, OF CLEVELAND, OHIO, A CORPORATION OF OHIO.

INTERNAL-DRIVE REAR AXLE.

1,305,454.  Specification of Letters Patent.  Patented June 3, 1919.

Application filed February 23, 1918. Serial No. 218,713.

*To all whom it may concern:*

Be it known that I, FRANK H. FARMER, a citizen of the United States, residing at Cleveland, in the county of Cuyahoga and State of Ohio, have invented a certain new and useful Improvement in Internal-Drive Rear Axles, of which the following is a full, clear, and exact description.

This invention is an improvement in the type of internal drive rear axle construction which forms the subject matter of my pending application, Serial No. 211,447.

The principal object of the invention is to make it possible and easy to remove and replace the differential mechanism commonly employed in rear axles of this sort when circumstances require, while the axle mechanism and the motor car with which it is connected continue to be supported upon the driving wheels, and without requiring that the associated mechanism be dismantled or disarranged to any considerable extent.

The invention consists in the construction and combination of parts shown in the drawing and hereinafter described and pointed out definitely in the appended claims.

In the drawings, the figure is a vertical central section longitudinal with respect to the axle, which is the same as transverse to the motor car with which the axle is to be connected.

The axle frame member is a stiff hollow structure which includes an enlarged part 3 which serves as a housing for the differential gearing, two alined axle tubes 4 and 5 which extend in opposite directions from said housing, and a hollow gear cage 6 at and rigid with the outer end of each axle tube. The drawing shows only one complete axle tube and its associated parts, but those familiar with this art will understand that the axle tube 5 of which only a part of the inner end is shown may be like the axle tube 4 which is shown, and that it carries at its outer end a gear cage which is like that shown; and will also understand that the wheel and associated mechanism shown at the outer end of the axle tube 4 is duplicated at the outer end of the axle tube 5.

The hollow axle frame member as shown is built up from several pieces, as shown in said prior application; but so far as concerns the present invention it is not material whether said axle frame member is made of one piece or many properly connected pieces. It is essential, however, that the centrally placed differential gear housing 3 shall have a removable cover plate 7 secured over a hole large enough to permit the removal and insertion of the differential gearing as a complete unit, or the different parts thereof to be assembled, connected and mounted within the housing. In the present exemplification of the invention the differential gearing is made of a number of parts which are separately introduced into the housing, and are then connected together in proper relation. This, however, is not a matter of consequence with respect to the present invention.

When the differential gearing is assembled and mounted in the housing, it is *per se* of familiar form, and includes a hollow drum 30 having oppositely extended alined tubular hubs 31, 31, which are rotatably mounted in bearings 32 supported by the walls of the housing. This drum carries a ring gear 33 by which it may be turned; and the compensating gears 34 are mounted on radial axes on said drum. These compensating gears mesh with two bevel gears 35, each having a hub 36 which is rotatably mounted in a hub of the differential drum.

A wheel 40 is mounted on the outer end of the axle frame member. This wheel is formed in its central part by two oppositely dished plates 41, 45, between which is a chamber 50. One of the plates 45 is rotatably mounted by means of annular ball bearings on the axle tube inside the gear cage referred to, and the other plate 41 is similarly mounted on the outer outwardly extended tubular cylindrical hub 8 which is a part of said gear cage and consequently a part of the axle frame structure. The gear cage referred to, therefore, is within this chamber 50. An internal ring gear 49 is fixed to the wheel within this chamber; and an intermediate gear 16 which is mounted on the gear cage is in mesh with this ring gear. To the extent described the construction as shown is substantially like that shown and described in said prior application; but in so far as the present invention is concerned, this particular construction may be varied to any extent desired.

A driving axle shaft 12 extends through each axle tube and serves as the means by which motion is transmitted from the differential mechanism to the driving mechanism of the associated wheel. At its inner end each axle shaft is formed with longitudinally extended splines 12ª which interlock with similar splines 37 in the associated gear 35 when the axle shaft end is inserted into said gear. Near its outer end this shaft is formed with other longitudinally extended splines 12ᵇ, and these interlock and establish a driving relation with similar splines 24 in the inner wall of the longitudinal hole which passes entirely through a pinion 22. This pinion is formed with hubs 23 at its ends, and these hubs are mounted by means of annular ball bearings 25 and 26 on the axle frame structure, so that said pinion is within the gear cage and is in mesh with the intermediate gear 16 and coaxial with the wheel.

When the splined portions of this axle shaft are in engagement with the gear 35, and with the tubular pinion 22, then rotary motion, imparted to the differential drum, will be transmitted from the gear 35 through the axle shaft 12 to the pinion 22, and thence through the intermediate gear 16 to the ring gear 49 and the wheel 40 to which said ring gear is secured.

There is a central hub plate 44 which is removably fixed to the outer plate 41 of the wheel. The axle shaft 12 is of such diameter in all of its parts that when this hub plate is removed the axle shaft may be pulled endwise outwardly and wholly removed if that is desired, through the pinion 22 and that hole in the outer plate of the wheel which is uncovered by the removal of the hub plate 44.

When this axle shaft has been so removed, either completely or to such an extent as causes the disengagement of its inner end from the gear 35, no obstacle remains to the removal from the differential housing of said differential mechanism, either as a unit or in a knocked down condition, depending upon the character of the differential mechanism described. Nor does the complete or partial removal of either or both of the axle shafts require or cause any disturbance of the operative relation of any of the other parts of the mechanism described. The axle will remain supported by the wheels; and it may in turn support the vehicle frame. When it is desired to reëstablish the driving connection between the differential mechanism and a wheel the axle shaft is passed endwise inward through the hole in the outer plate of the wheel, through the hole in the outer hub 8 of the gear casing, through the tubular pinion 22, through the axle tube, and into the gear 35. This having been done, the plate 44 is secured over the hole in the outer side of the wheel. This plate has on its inner face a thickened boss which lies close to the outer end of the axle shaft, and therefore any such outward movement of the axle shaft as might disengage it from the gear 35 will be prevented.

Having described my invention, I claim:

1. In an internal drive rear axle structure, the combination of a hollow axle frame member having a portion which serves as a gear housing, two alined axle tubes which extend in opposite directions from said gear housing, and a tubular gear cage rigid with the outer end of each axle tube, differential mechanism mounted in said gear housing, a removable cover plate for said gear housing, and, associated with each axle tube, a wheel which is rotatably supported by said axle frame member on both sides of said gear cage, a co-axial tubular pinion rotatably mounted in said gear cage, an axle shaft which is of such diameter that it may pass through said tubular pinion, and which has longitudinal splined connection with said pinion and with the differential mechanism, and a removable hub plate which forms a part of the outer wall of the wheel.

2. In an internal drive rear axle structure, the combination of a hollow axle frame member having as parts thereof a laterally extended axle tube and a tubular gear cage which is rigid with the outer end of said axle tube and which has on its outer face a coaxial tubular boss, a wheel which has a central chamber which contains said gear cage which wheel is rotatably supported by said axle tube inside said gear cage and by said tubular boss outside the gear cage, a coaxial tubular pinion rotatably mounted in said gear cage, an internal ring gear fixed to the wheel within said chamber, an intermediate gear mounted in the gear cage in mesh with said pinion and ring gear, and an axle shaft which extends through the axle tube and through said pinion and has when in operative position an interlocking spline engagement with the latter.

3. In an internal drive rear axle, the combination of the axle tube which forms a part of a hollow axle frame member thereof, a gear cage which is at and rigid with the outer end of said axle tube and which has an outwardly extended tubular boss on its outer side, a wheel which embraces said gear cage and has one bearing upon the axle tube inside said gear cage and one upon the tubular boss on said gear cage, an internal ring gear secured within said wheel, an intermediate gear mounted in the gear cage in mesh with said gear, and a tubular pinion which is rotatably mounted on the gear cage coaxially with said wheel, an axle shaft which is movable through said pinion, and which, when in operative position, has an interlocking splined connection therewith, and means engaging the inner end of said axle section for rotating it.

In testimony whereof, I hereunto affix my signature.

FRANK H. FARMER.

Witnesses:
H. C. McGoey,
A. Oster.

Copies of this patent may be obtained for five cents each, by addressing the "Commissioner of Patents, Washington, D. C."